(12) United States Patent
Saunders et al.

(10) Patent No.: US 7,677,792 B2
(45) Date of Patent: Mar. 16, 2010

(54) AUTOMATIC STIRRING SYSTEM (75) Inventors: Craig M. Saunders, Rocky River, OH (US); Sarah N. Antonetti, Cleveland, OH (US)

(73) Assignee: Nottingham-Spirk Design Associates, Inc., Cleveland, OH (US)

( * ) Notice: Subject to any disclaimer, the term of this patent is extended or adjusted under 35 U.S.C. 154(b) by 890 days.

(21) Appl. No.: 11/442,482

(22) Filed: May 26, 2006

(65) Prior Publication Data

US 2006/0278095 A1 Dec. 14, 2006

(51) Int. Cl.
*B01F 7/16* (2006.01)
(52) U.S. Cl. .................. 366/281; 366/330.3; 99/348
(58) Field of Classification Search .......... 366/297, 366/241–254, 280–284, 238.2, 325.94, 330.3; 99/348
See application file for complete search history.

(56) References Cited

U.S. PATENT DOCUMENTS

| | | | | |
|---|---|---|---|---|
| 565,007 A | * | 8/1896 | Lawton | 366/328.2 |
| 3,635,147 A | * | 1/1972 | Lee | 99/348 |
| 4,125,065 A | * | 11/1978 | Lee | 99/348 |
| 4,151,792 A | | 5/1979 | Nearhood | |
| 5,163,357 A | * | 11/1992 | Felknor et al. | 99/323.5 |
| 5,547,279 A | * | 8/1996 | Spitzer, Sr. | 366/251 |
| 5,617,774 A | * | 4/1997 | LaVelle et al. | 99/348 |
| 5,711,602 A | | 1/1998 | Rohring et al. | |

* cited by examiner

*Primary Examiner*—Tony G Soohoo
(74) *Attorney, Agent, or Firm*—Fay Sharpe LLP (57) ABSTRACT

The present invention relates to an automatic stirring system that is selectively mounted to a cooking vessel. The cooking vessel includes a handle, an opening for receiving food items, and a lid. The automatic stirring system includes a housing mounted to the handle, a ring gear rotatably mounted to the cooking vessel, a drive assembly for rotating the ring gear, and at least one stirring vane attached to the ring gear. In various other embodiments, the automatic stirring system includes at least one forward swept stirring vane, at least one aperture in the stirring vane, a variable speed control unit, and a component orientation that provides substantially unimpeded access to the opening of the cooking vessel.

23 Claims, 9 Drawing Sheets

FIG. 9

AUTOMATIC STIRRING SYSTEM

FIELD OF THE INVENTION

The present invention relates to the art of stirring systems used in the preparation of food items. In particular, the present invention involves an automatic stirring system that may be mounted to a conventional cooking pot, vessel, or pan.

BACKGROUND

In preparing various food items a common step usually involves stirring any number of ingredients together. In some cases the stirring process must be done continuously as is common in the preparation of certain soups, sauces, and puddings. If due to any number of reasons the stirring process is neglected, avoided, or abandoned, the food item may become burnt because of localized overheating of the food mixture. At the very least, a lack of stirring will result in a non-homogenous food product that is unevenly cooked thereby having an inconsistent taste. It is likely that the resulting food item will be offensive to the user or cook and will end up being thrown away.

While stirring systems that stir the contents of a cooking vessel are known, they exhibit many disadvantages. One disadvantage involves the overall size and complexity of these systems. Some systems require a physical and permanent installation either to the cooking surface, a wall surface, or the cooking vessel itself. These permanent type installations are unattractive and often consume precious work space. Another disadvantage involves the proximity of the stirring elements to the cooking vessel. Often the stirring elements neglect to fully agitate the food mixture that may become attached to the inner wall and bottom surfaces of the cooking vessel. Yet another disadvantage relates to the design of the stirring elements. Most stirring elements are generally flat. As explained herein, a flat stirring element is less effective at stirring because it tends to push fluid and other food items toward the center of the cooking vessel. This may result in a swirling vortex where only certain ingredients will be mixed. Still another disadvantage involves the overall orientation of the various components required to stir the contents of the cooking vessel. Most stirring systems consume most if not all of the opening of the cooking vessel. This makes it extremely difficult for the user to observe, add ingredients to, or remove portions of the food mixture while these stirring systems are attached or operating. Yet another disadvantage involves the user's ability to adjust the speed of the stirring system of the system. Some systems may offer various speed settings, however, these speed settings are often too slow or too fast to obtain optimal mixing.

Therefore, it is the object of the present invention to provide an improved automatic stirring system.

SUMMARY OF THE INVENTION

The present invention relates to an automatic stirring system that offers a variety of improvements over other prior art stirring systems.

In a first embodiment, the automatic stirring system is designed to be selectively mounted to a common household cooking vessel. The automatic stirring system generally includes a housing, a drive assembly, and a stirring vane assembly. The housing is adapted to be mounted on a handle of the cooking vessel. The drive assembly, which is disposed internally to the housing, includes a power source, a variable speed control unit, a DC motor, and a transmission with an output drive gear. The stirring vane assembly includes a pair of forward swept stirring vanes and a beveled ring gear. The drive gear engages the ring gear of the stirring vane assembly. The ring gear is rotatably mounted about an opening of the cooking vessel. The stirring vanes are disposed internally to the cooking vessel and come into close proximity with an inner wall surface and a bottom surface of the cooking vessel.

The first embodiment of the automatic stirring system offers several advantages. One advantage involves the close fitting stirring vane assembly. As the stirring vanes rotate, substantially all of the food mixture in the cooking vessel is agitated. This includes the food mixture which clings to both the inner wall surface and the bottom surface of the cooking vessel. Another advantage involves the forward swept design of the stirring vanes that prevents the food mixture from collecting in the center of the cooking vessel and enhances homogenous mixing of the food mixture. Yet another advantage of the first embodiment involves the use of the variable speed control unit. The variable speed control unit allows the user to adjust the speed of the unit as the consistency of the food mixture changes. Still another advantage involves the orientation of the drive assembly and stirring vane assembly to allow substantially unimpeded access to the opening of the cooking vessel. This allows the user to easily add ingredients or remove the food mixture as necessary even while the stirring system is installed or operating.

In another embodiment, the speed control unit of the drive assembly includes a speed sensor such that the output speed of the motor or the beveled gear is monitored. As load on the stirring vane assembly changes, the speed sensor enabled speed control unit would adjust the power to provide a constant output speed of the drive assembly.

In yet another embodiment, the automatic stirring system would include an aluminum or stainless steel housing, ring gear, and stirring vanes to increase the durability and longevity of the automatic stirring system.

In still another embodiment, various sized stirring vane assemblies would be driven by one interchangeable housing and drive assembly unit. Therefore, one housing and drive assembly unit could be used to drive the stirring vanes of different cooking vessels.

In yet another embodiment, the ring gear is designed to include an additional inner flange to allow the lid of the cooking vessel to sit on top of the ring gear. This would allow the cooking vessel to be capped as if the automatic stirring system were not installed on the cooking vessel.

BRIEF DESCRIPTION OF THE DRAWINGS

The invention may take form in certain structures and components, several embodiments of which will be described in detail in this specification and illustrated in the accompanying drawings. In the drawings.

DETAILED DESCRIPTION

Figure 1:
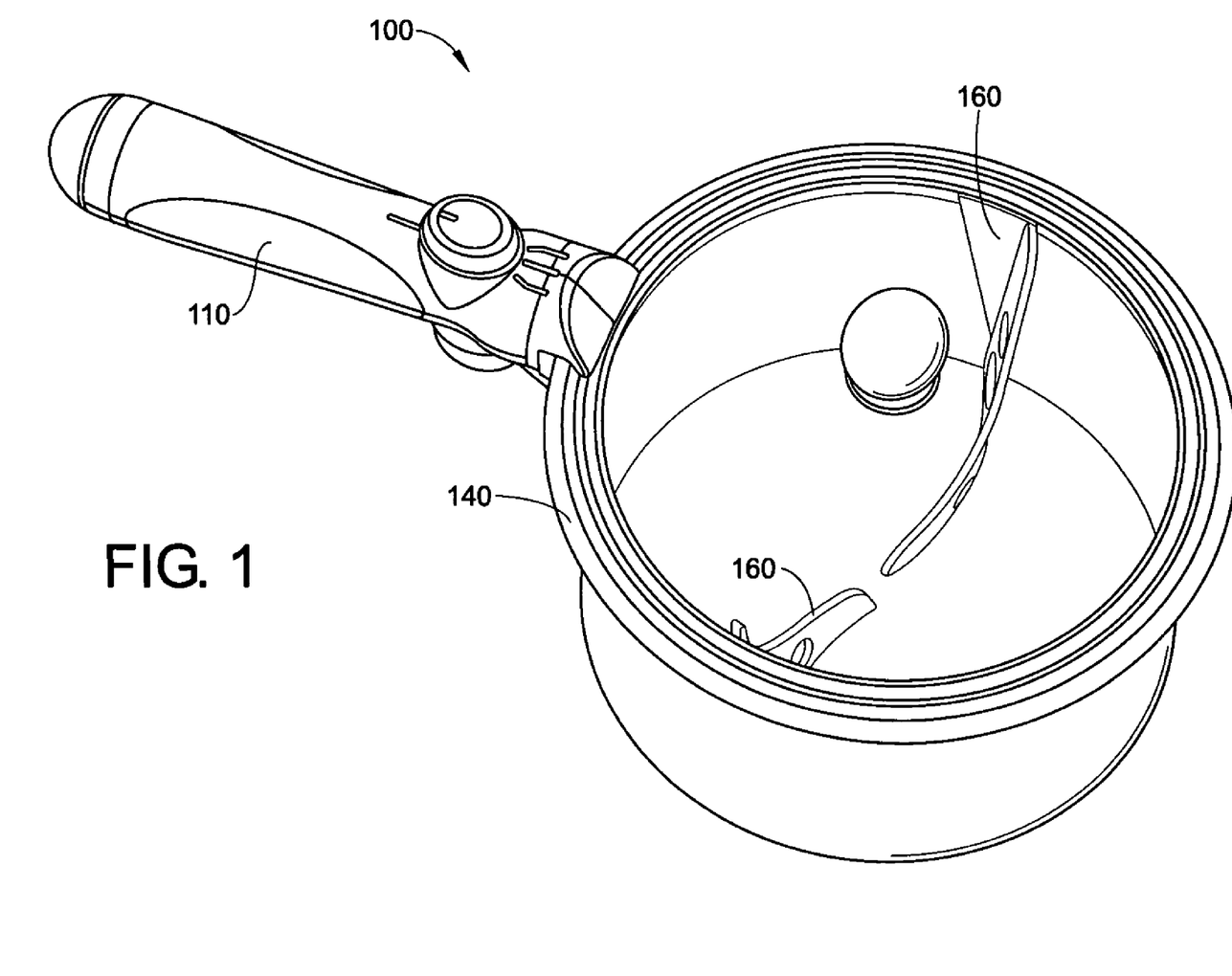
FIG. 1 is a perspective view of a first embodiment of an automatic stirring system according to the present invention.

With reference to FIG. 1, a first embodiment of an automatic stirring system 100-is shown. The stirring system 100 generally includes a housing 110, a drive assembly 120 (FIG. 5), and a stirring vane assembly 135. The stirring vane assembly 135 includes a ring gear 140 and a pair of stirring vanes 160.

Figure 2:
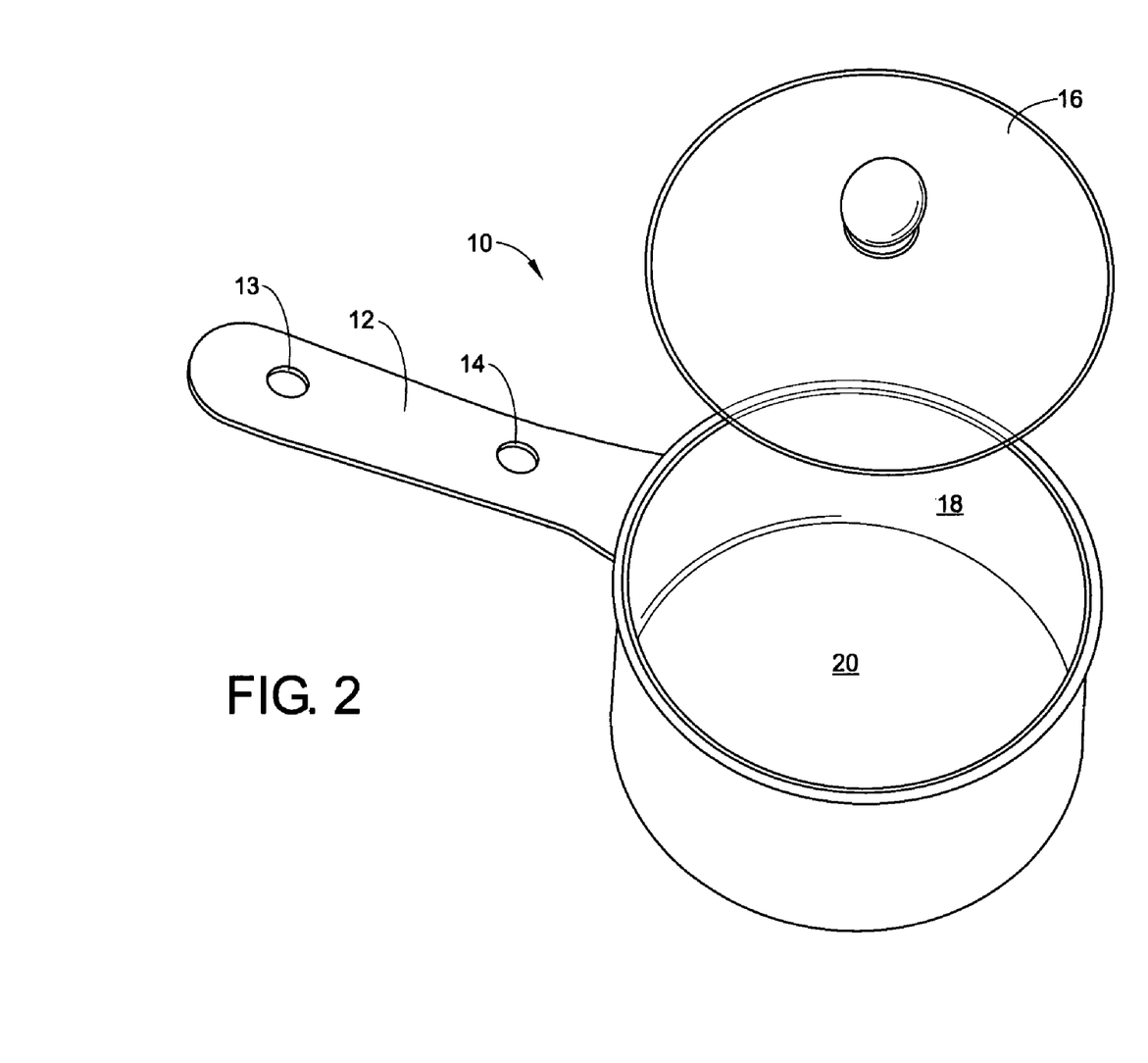
FIG. 2 is a perspective view of a prior art cooking vessel.

With reference to FIGS. 1 and 2, the housing 110 is adapted to attach to the upper portion of an existing handle 12 of a cooking vessel or sauce pan 10. The cooking vessel 10 includes a lid 16, an inner wall surface 18 and an inner bottom surface 20. In addition, the handle 12 includes at least one aperture 14. The housing 110 of the automatic stirring system is designed to engage the aperture 14 of the handle 12 of the cooking vessel 10. Also, the ring gear 140 and stirring vanes 160 are adapted to fit within the cooking vessel 10. Specifically, the stirring vanes 160 are designed to come into close proximity with the inner wall surface 18 and the inner bottom surface 20. The cooking vessel 10 is generally representative of prior art cooking vessels.

Figures 3, 3A:
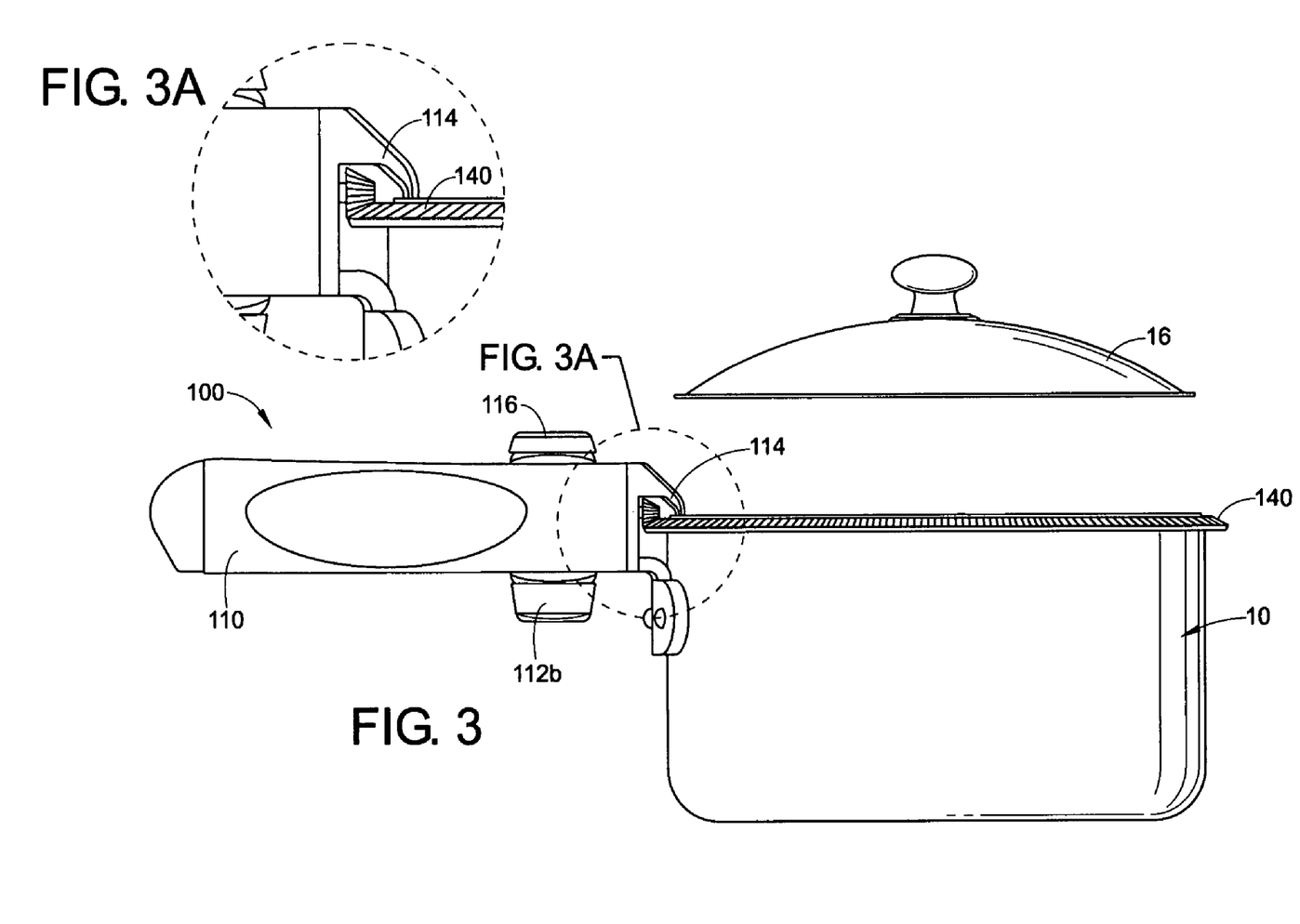
FIG. 3 is a side view of the first embodiment of the automatic stirring system illustrating the installation of the automatic stirring system onto the prior art cooking vessel.
FIG. 3A is a side view of the first embodiment of the automatic stirring system showing an enlarged detail view illustrating the engagement of a drive gear and a ring gear.
Figure 4:
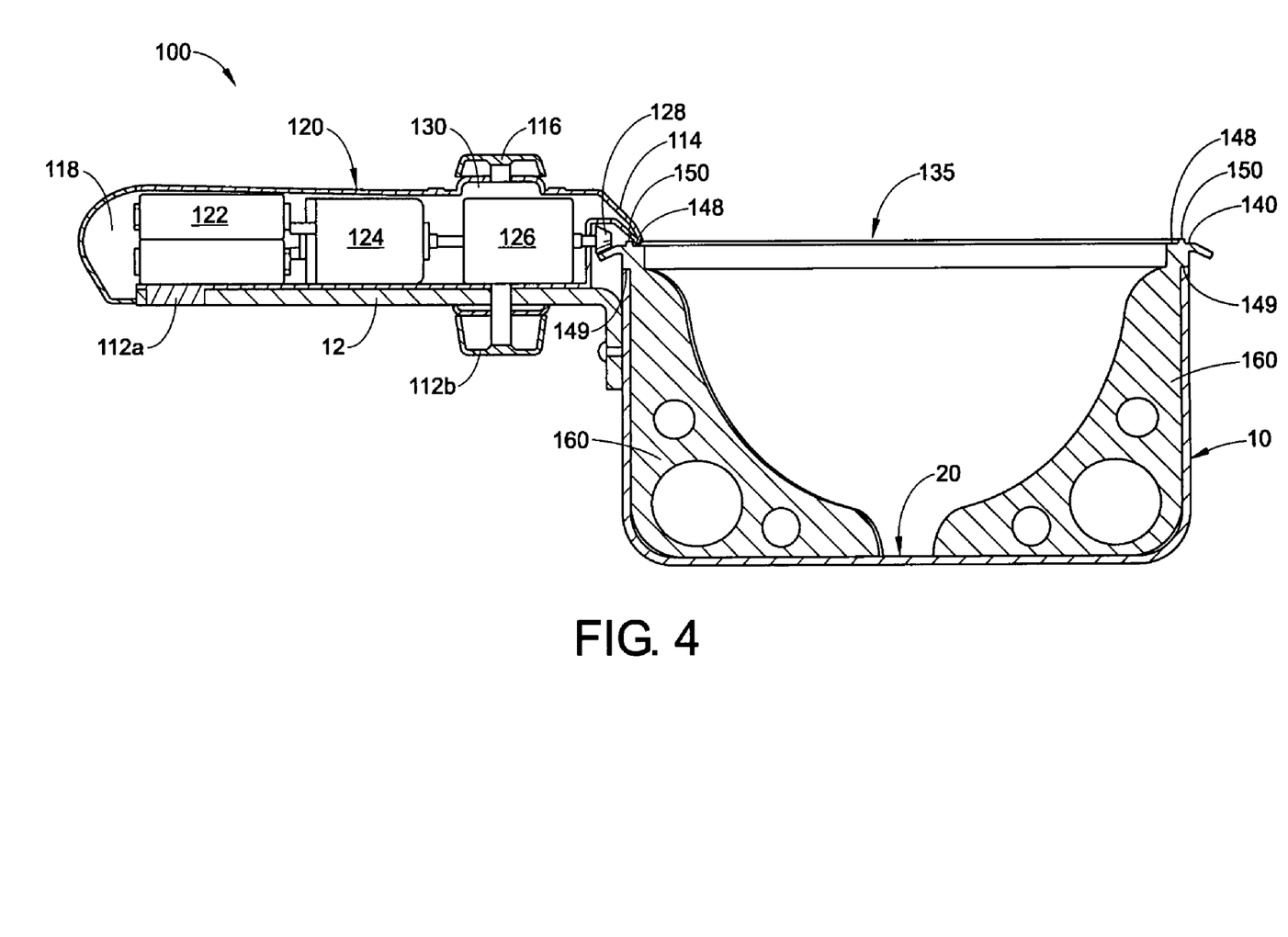
FIG. 4 is a cross sectional view of the first embodiment of the automatic stirring system illustrating a drive assembly and a stirring vane assembly.

Now with references to FIGS. 3-4, a side view of the first embodiment of the automatic stirring system 100 as installed on the prior art cooking vessel 10 is shown. The housing 110 of the automatic stirring system 100 is mounted to the handle 12 of the cooking vessel 10. The housing 110 includes a pair of attachment points. The first attachment point consists of a downwardly projecting boss 112a which engages a distal aperture 13 along the handle 12. A second attachment point consists of a threaded knob 112b which engages a stem through a proximal aperture 14 in the handle 12. The threaded knob 112b acts to secure the housing 110 to the handle 12 whereas the boss 112a prevents the housing 110 from translating in a lateral direction along a top surface of the handle 12. The housing 110 further includes a guide lip 114, a speed control knob 116 and a drive assembly compartment 118.

With continuing reference to FIG. 4, a cross section of the drive assembly 120 is also shown. The drive assembly 120 generally includes a power source 122, a prime mover or motor 124, a transmission 126 having a drive gear 128 and a variable speed control unit 130. The power source 122 may consist of a battery or an external AC to DC power adapter. The power source 122 is operatively connected through the speed control unit 130 to a DC motor 124. The motor 124 is then operatively connected to the transmission 126 which reduces the output speed (or RPMs) of the motor, but increases the available torque. The low RPM and high torque is transmitted to the ring gear 140 via the drive gear 128. The drive gear may be beveled to increase contact area between it and the ring gear. The speed control unit 130 may be a rheostat, switching power transistor, MOSFET, pulse-width modulation (PWM), or any other power regulating device. Regardless of the technique used to regulate the power supplied to the motor 124, the motor 124 will have an infinite range of speed settings from very low RPM through the top speed of the motor 124. Alternatively, the speed control unit 130 may provide high/medium/low type speed settings or take the form of a simple on/off switch.

In the first embodiment, the transmission 126 takes the form of a planetary gear reduction set. The planetary gear reduction set provides a very high gear ratio in a very compact space as is necessary for the transmission 126 to fit within the drive assembly compartment 118 of the housing 110. As the drive gear 128 rotates, the teeth of the drive gear engage a plurality of teeth 146 of the ring gear 140 to cause the ring gear to rotate in either a clockwise or counterclockwise direction. Since the first embodiment 100 uses a DC motor 124, it is extremely easy to reverse the polarity of the motor 124, thereby reversing the direction of the stirring vane assembly 135. However, because the forward swept design of the stirring vane 160 is optimized to rotate in the counterclockwise direction (as viewed from the top in FIG. 6), reversing the direction of the ring gear would not be as beneficial. Because the drive gear 128 shown in FIG. 4 is beveled, the torque which is transmitted through the drive gear 128 into the ring gear 140 will also result in a thrust force extending radially inward toward the ring gear 140. Because of this thrust load, the guide lip 114 of the housing 110 or another retention device is necessary to maintain positive contact between the teeth of the drive gear 128 and the teeth 146 of the ring gear 140. In order to do so, the guide lip 114 engages a guide track 150 of the ring gear 140. In addition, the guide lip 114 provides a mechanism for restraining the stirring vane assembly 135 within the cooking vessel 10 by continuously maintaining a small downward thrust load along an upper thrust surface 148 of the ring gear 140. Between the guide lip 114 and the cooking vessel 10, a lower thrust surface 149 prevents the stirring vanes 160 from rubbing excessively up against the bottom surface 20 of the cooking vessel 10.

Figure 5:
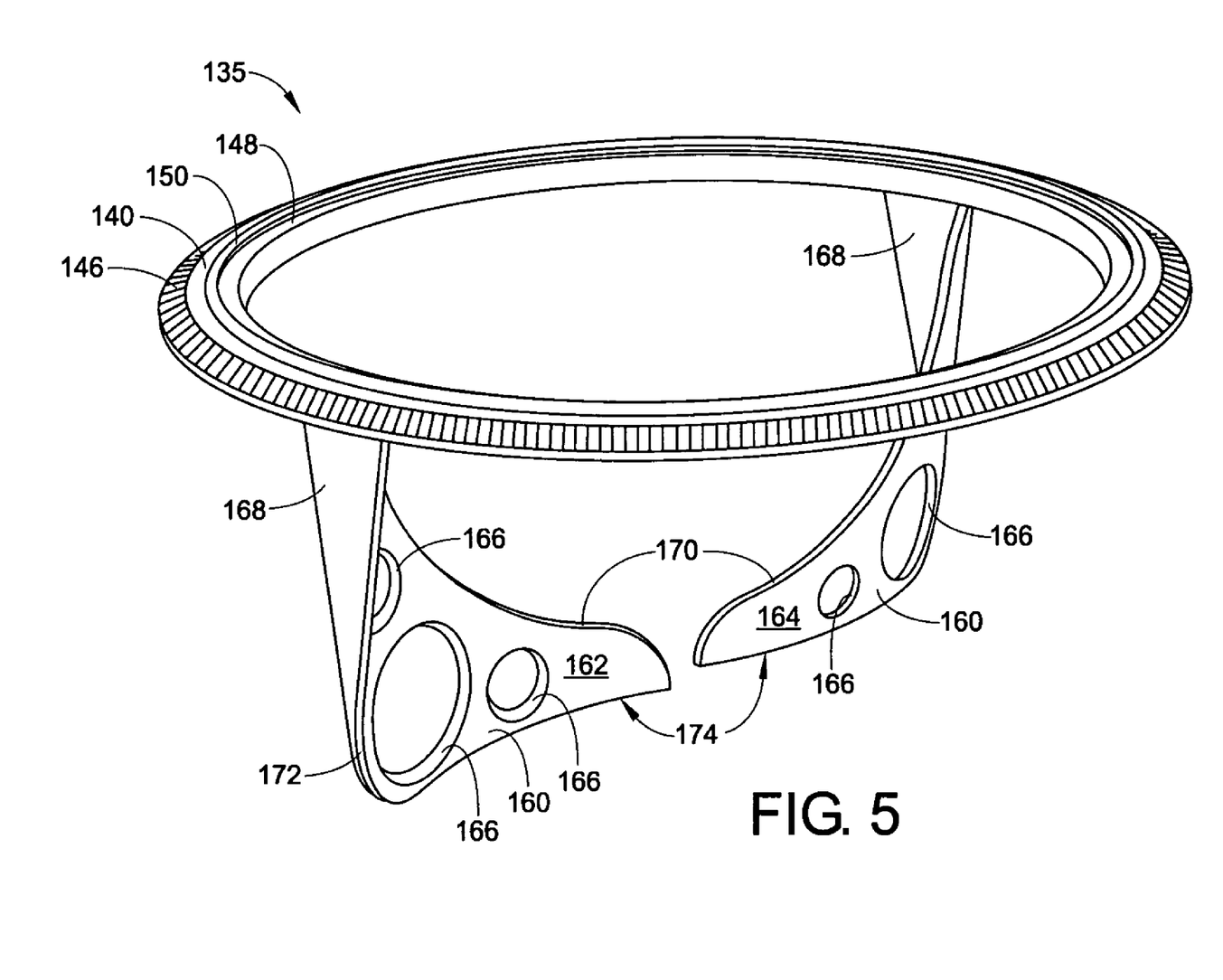
FIG. 5 is a perspective view of the stirring vane ring gear assembly of the first embodiment of the automatic stirring system.
Figure 6:
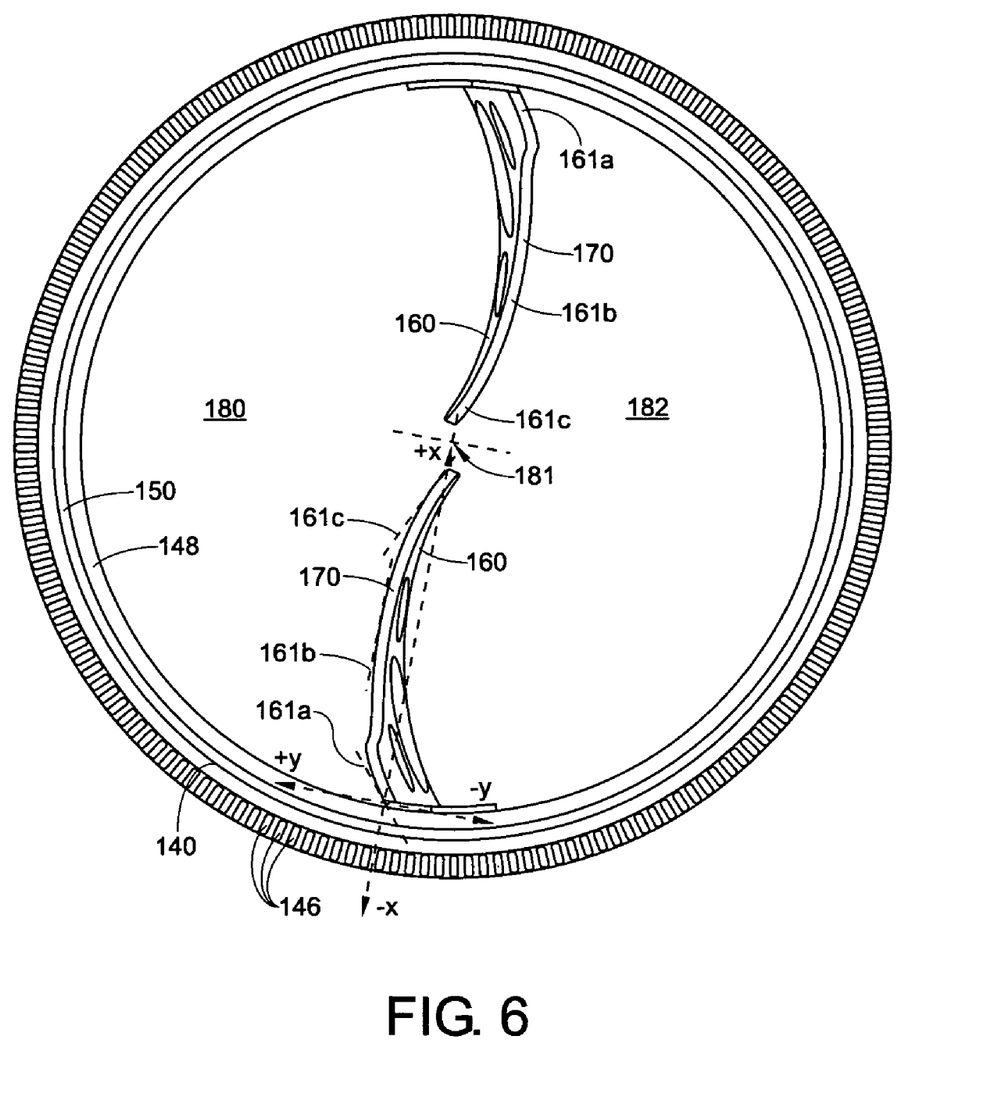
FIG. 6 is a top view of the stirring vane assembly of the first embodiment of the automatic stirring system.

Now with reference to FIG. 5, a perspective view of the ring gear 140 and the stirring vane assembly 135 of the first embodiment is shown. As mentioned previously, the ring gear 140 includes the plurality of beveled gear teeth 146, the guide track 150, the upper thrust surface 148 and the lower thrust surface 149 (FIG. 6). In the first embodiment, the stirring vane assembly 135 involves two stirring vanes 160, each vane being oriented 180° apart from the other. The stirring vanes 160 include a leading surface 162 and a trailing surface 164. In addition, the stirring vane 160 may include one or more apertures 166 which extend generally perpendicular to the leading surface 162 and the trailing surface 164. The general purpose for the apertures 166 are to allow various flow paths either directly through the stirring vane 160 or over an upper edge 170 of the stirring vane 160. As the stirring vanes 160 rotate through a mixture of solids and fluids contained in the cooking vessel, some of the mixture will flow through the vanes 160 and some will flow over or around the vanes 160. In addition, the stirring vanes 160 further include a gusset 168 to provide stiffening along an outer edge 172 of the stirring vanes 160. The gussets 168 are adhered, molded, fastened or otherwise secured to the ring gear 140 at an upper portion of the stirring vanes 160.

Now with reference to FIG. 6, a top view of the stirring vane assembly 135 of the first embodiment is shown. Also shown are the plurality of ring gear teeth 146, the guide rib 150 and the upper thrust surface 148. More importantly, FIG. 6 clearly illustrates the forward swept design of the stirring vanes 160. As mentioned previously, the stirring vanes 160 in the first embodiment are intended to rotate in a counterclockwise direction. The forward swept design coupled with the counterclockwise rotation of the stirring vanes 160 has the effect of cupping or retaining the mixture of solids and fluids immediately in front of the leading surface 162 of each respective stirring vane 160. This cupping effect prevents the mixture from escaping either inward toward the center of the cooking vessel or outward towards the inner wall of the cooking vessel. It is also important to note that the stirring vanes 160 do not connect at a center portion indicated by reference numeral 181. Because each stirring vane 160 is independent, this allows the mixture to communicate from a first side or hemisphere 180 to a second side or hemisphere 182. Furthermore, the apertures 166 provide additional mixing of ingredients that are added to or within the cooking vessel. In addition, and as best shown in FIG. 6, each of the respective stirring vanes can be angled rearwardly (i.e., tilted or angled in a rearward direction such that the leading surface of the stirring vane is visible from a top or plan view).

Had the design of the stirring vanes 160 been substantially flat and straight, such that the stirring vanes followed a radial (as indicated by the x axis in FIG. 6) between the inner wall and the center 181 of the cooking vessel, the stirring and mixing effect would be significantly impaired. A design using straight or flat stirring vanes would tend to cause the mixture to naturally progress from the inner wall towards the center 181 of the cooking vessel. This progression would occur because as the flat stirring vane would move through the mixture, the mixture would become trapped between the inner wall surface of the cooking vessel and the flat leading surface of the stirring vane. Because the mixture would be restricted, a slightly higher pressure would result near the leading surface of the vane and the inner wall surface, thus, urging the mixture toward the center 181 of the cooking vessel. As the mixture flows toward the center 181 a swirling vortex may form where only certain less dense ingredients will be mixed. However, the forward swept design of the stirring vane 160 of the first embodiment 100 prevents this from occurring.

With continuing reference to FIGS. 5-6, as the mixture encounters the leading surface 162 of the forward swept stirring vane 160, the mixture tends to gravitate towards a middle location 161b of the stirring vane 160, rather than toward the center 181. This occurs because the mixture encounters an even greater resistance (or pressure) due to the increasing inclination of the forward swept stirring vane 160. Using a typical X-Y reference whose positive X axis is located along a length of the stirring vane 160, the inclination (or instant slope) of the stirring vane 160 changes from a positive slope at a root location 161a, to a zero slope near the middle location 161b, to a negative slope at a tip location 161c. As the mixture encounters the leading surface 162, the mixture naturally progresses towards the region of zero slope (location 161b) rather than escaping immediately around the tip location 161c. Thus, the mixture tends to stay in front of the stirring vane 160 rather than progressing towards the center 181.

Figure 7:
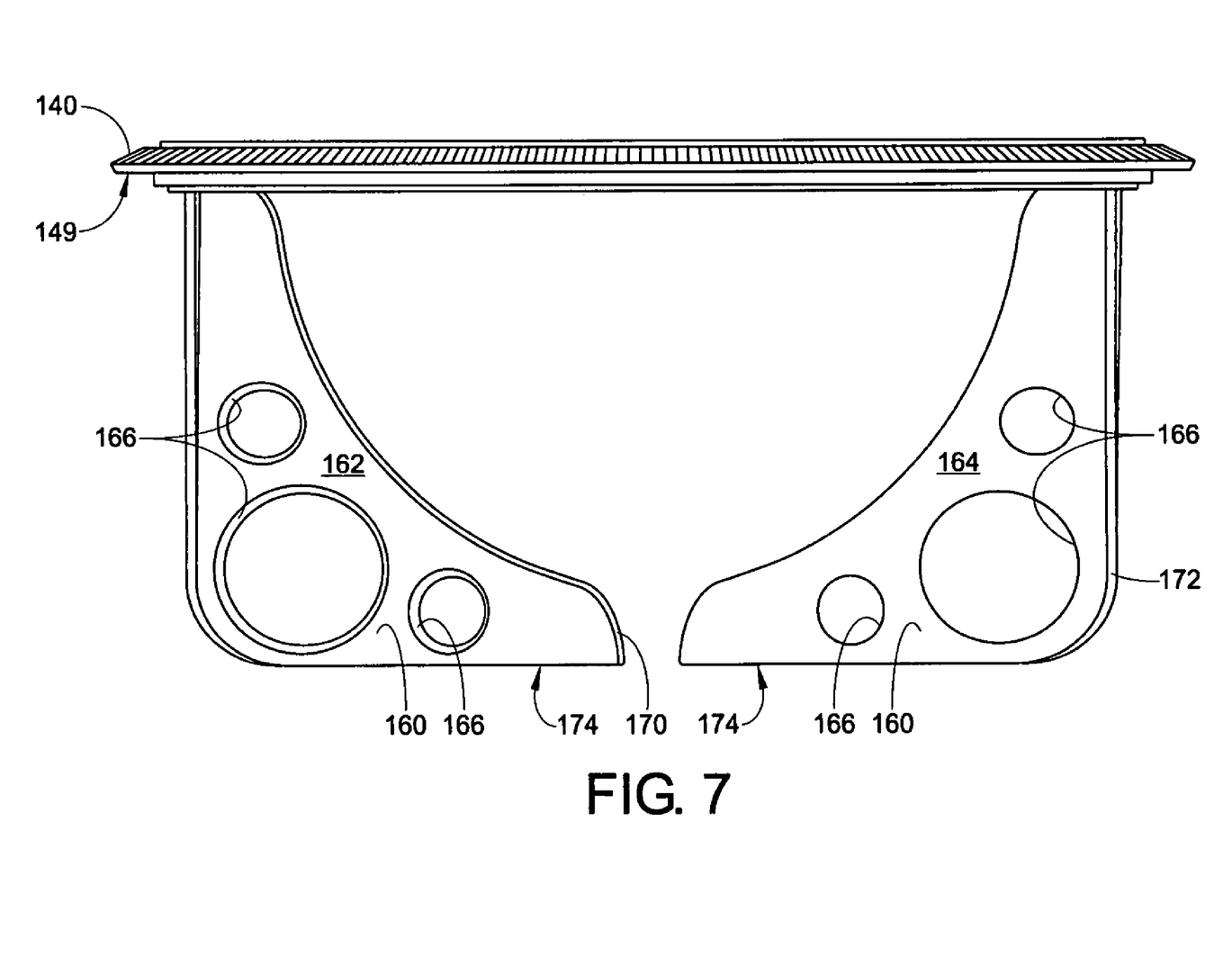
FIG. 7 is a side view of the stirring vane assembly of the first embodiment of the automatic stirring system.

With reference to FIG. 7, a side view of the stirring vane assembly 135 of the first embodiment is shown. The lower thrust surface 149 of the ring gear 140, as well as the leading surface 162 and the trailing surface 164 of the stirring vanes 160 are clearly illustrated. Also, the apertures 166 in the stirring vanes 160 are clearly visible, as well as the upper edge 170 and the outer edge 172 of the stirring vane 160. Once again, it is important to note that the outer edges 172 and the bottom edge surface 174 of the stirring vanes 160 come within very close proximity to the inner wall surface 18 and the inner bottom surface 20, respectively, of the cooking vessel. This prevents any partially cooked mixture of the fluids or solids from sticking to the bottom surface 20 or the inner wall surface 18 and further ensures a homogeneous consistency of the mixture.

With reference to FIGS. 1-4, the installation of the automatic stirring system 100 onto a prior art cooking vessel 10 is relatively simple. First, the stirring vane assembly 135, which is appropriately sized, is slid into the cooking vessel 10. The stirring vane assembly 135 should fit very closely within the inner diameter of the cooking vessel 10. Also, the lower thrust surface 149 should glide easily along an upper rim of the opening of the cooking vessel 10. In addition, the bottom edge surface 174 of the stirring vane 160 should just contact the bottom surface 20 of the cooking vessel 10 without creating any appreciable drag during operation. A large appreciable drag force would prevent the stirring vane from turning easily within the cooking vessel 10. Also, excess drag along the bottom surface 20 or inner wall surface 18 of the vessel 10 would cause increased wear not only of the vessel 10 but also of the drive assembly 120 and stirring vane assembly 135. Once the stirring vane assembly 135 is correctly matched and installed within the cooking vessel 10, the housing 110 and drive assembly 120 are installed onto the handle 12 of the cooking vessel 10. The housing 110 and drive assembly 120 should be aligned such that the drive gear 128 and the guide lip 114 positively engage the ring gear 140. Otherwise, the teeth of the drive gear 128 may slip. Once the location of the housing 110 has been adjusted, the threaded knob 112b is engaged onto the stem of the housing 110, and tightened.

Once installation is complete, the power source 122 (for example, a battery or an external AC to DC power adapter) is then electrically connected. The cooking vessel 10 with the automatic stirring system 100 installed, is then placed onto a cooking surface where the user may add the food ingredients or mixture to be cooked in a conventional manner. At the user's discretion, the automatic stirring system 100 may be activated by rotating the speed control knob 116 to achieve a desired stirring speed. From time to time, as more ingredients are added into the cooking vessel 10 or as the quantity or viscosity of the mixture changes, the speed control knob 116 may need to be adjusted to accommodate for the increase or decrease in drag.

Figure 8:
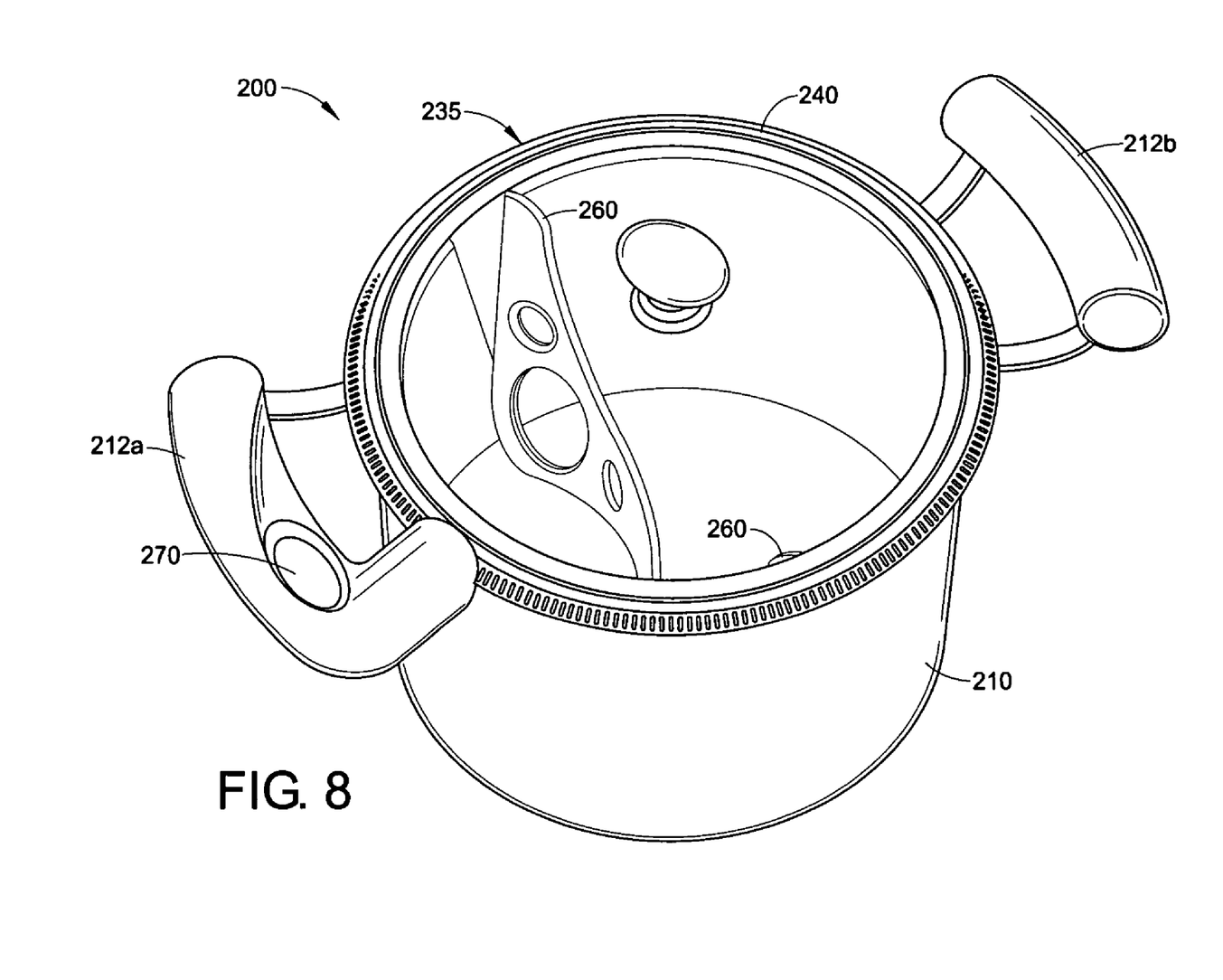
FIG. 8 is a perspective view of a second embodiment of an automatic stirring system according to the present invention.
Figure 9:
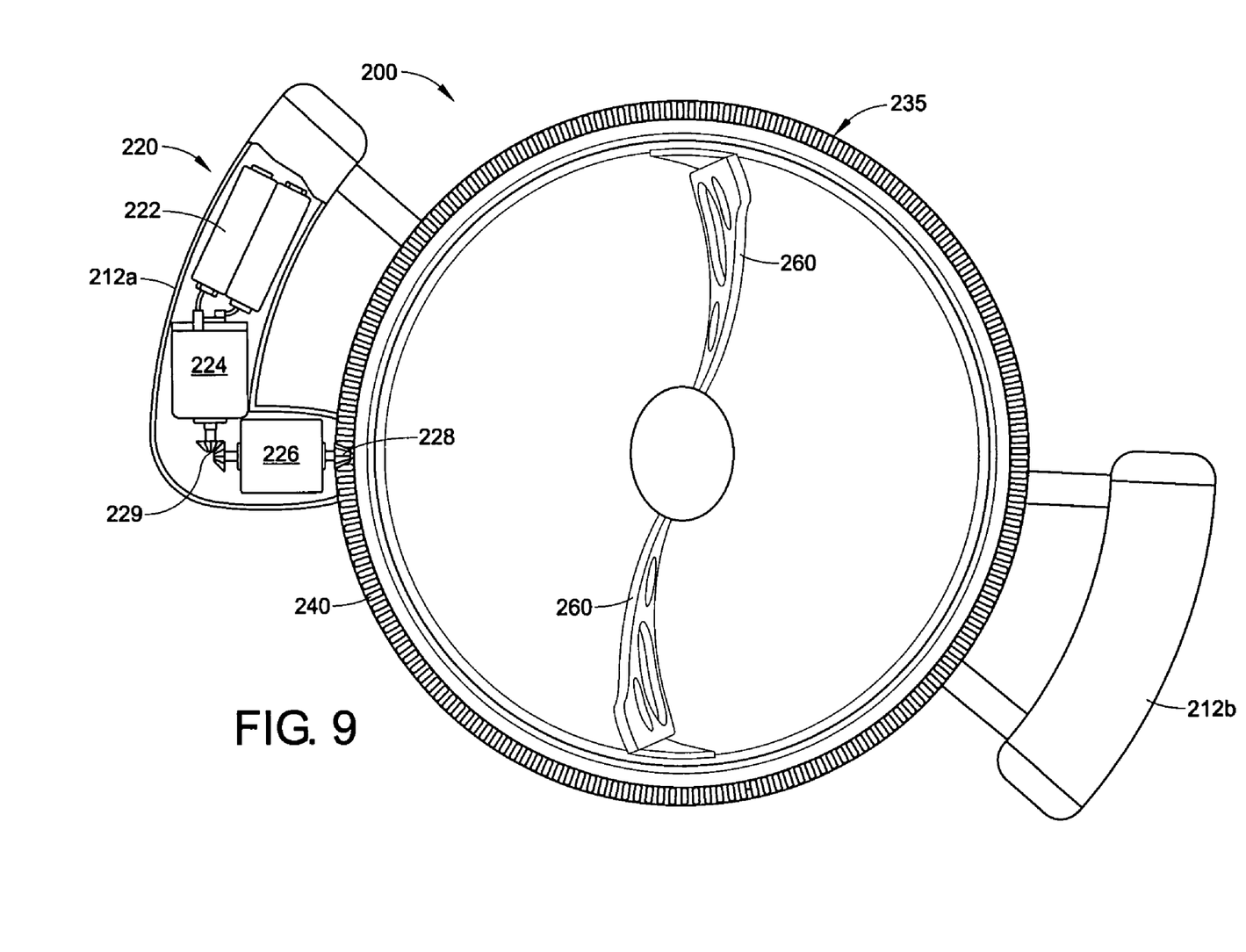
FIG. 9 is a top view of the automatic stirring system of FIG. 8 illustrating an integrated drive assembly having a right angle drive.

With reference to FIGS. 8-9, a second embodiment of an automatic stirring system 200 is shown. The second embodiment shares many characteristics and structures similar to that of the first embodiment. However, there are two primary distinctions. The first distinction involves the use of a cooking vessel 210 having a first handle 212a and a second handle 212b mounted 180° apart. Another distinction involves a drive assembly 220 that is integrated with the cooking vessel 210, specifically, within the first handle 212a. As with the first embodiment, the second embodiment includes a power source 222, a motor 224, a reduction unit or transmission 226, and an output drive gear 228. The primary difference between the drive assembly of the first embodiment and the drive assembly 220 of the second embodiment involves the coupling between the motor 224 and the reduction or transmission unit 226. In particular, the coupling involves a 90° or right angle drive 229. The right angle drive permits the motor 224 and the transmission 226 to be fitted properly within the first handle 212a. Naturally, a combined motor and reduction unit having adequate torque capability could be compactly made to fit within the volume generally occupied by the transmission 226 of the second embodiment, thus eliminating the need of the right angle drive 229 altogether.

The second embodiment operates in a similar manner as described previously with respect to the first embodiment. A stirring vane assembly 235 is disposed within the cooling vessel 210. It includes a ring gear 240 and a pair of stirring vanes 260. As with the first embodiment, the drive gear 228 engages the ring gear 240 to cause the stirring vane assembly 235 to rotate within the cooking vessel 210. In addition, the stirring vanes 260 include the same forward swept design to promote uniform mixing of the mixture or food ingredients within the cooking vessel 210. Also, the second embodiment of the automatic stirring system 200 includes an integrated speed control or switching unit 270 within the first handle 212a. The switching unit 270 may be a simple on/off switch or may be a momentary switch having a speed control circuit allowing the user to toggle among multiple speed settings (such as high, medium and low). In all other respects, the operation of the second embodiment of the automatic stirring system 200 is the same as that of the first embodiment.

In another embodiment, the speed control unit of the drive assembly includes a speed sensor such that the output speed of the motor, drive gear or ring gear is monitored. As the load increases, the speed sensor would reflect any changes in the rotational speed of the stirring vane assembly. If the speed sensor indicates a lower speed than what is set, the speed control unit would increase the voltage and/or current supply to the motor thereby creating greater torque to overcome the additional drag of the ingredients in the cooking vessel.

In yet another embodiment, the automatic stirring system would include a housing, a stirring vane assembly, and a drive assembly that would be fabricated from a high grade aluminum or stainless steel alloy. In addition, the same housing and drive assembly unit would be designed to accommodate an entire range of cooking vessels. In which case each cooking vessel would use a stirring vane assembly that is appropriately matched for that given cooking vessel. Therefore, a user who owns a range of cooking vessels with varying diameters or capacities need not have a separate housing and drive assembly for each vessel.

In still another embodiment, the ring gear is designed to include an additional upper or inner flange to allow the lid of the cooking vessel to sit on top of the ring gear. This would allow the cooking vessel to be capped as if the automatic stirring system were not installed on the cooking vessel. In this embodiment, the lid would simply rotate along with the ring gear and would not inconvenience the user or impact the mixing of the food mixture.

Again, it should be noted that the various embodiments of automatic stirring systems disclosed herein provide several distinctions and advantages over the prior art. For example, the user or chef is not obstructed from being able to add or remove ingredients. In other words, the mechanisms that are involved are oriented about a periphery of the cooking vessel such that the user may add or remove the mixture with relative ease and without obstruction of the components of the automatic stirring system. In addition, the swept design of the stirring vanes optimize homogenous mixing. Still further, the drive assembly and housing may be interchanged with various cooking vessels and stirring vane assemblies.

Several exemplary embodiments have thus been described. Modifications and alterations may occur to others upon reading and understanding the preceding detailed description. It is intended that the exemplary embodiments be construed as including all such modifications and alterations insofar as they come within the scope of the appended claims or the equivalents thereof.

The invention claimed is:

1. An automatic stirring system for being selectively mounted to an associated cooking vessel, the cooking vessel having an opening for receiving food items, the automatic stirring system comprising:

at least one forward swept stirring vane disposed within the associated cooking vessel, the at least one forward swept stirring vane including a leading surface, the leading surface having a generally concave profile extending in a radial direction from an axis of rotation of the at least one forward swept stirring vane;

a drive assembly operatively connected to the at least one forward swept stirring vane for rotating the at least one forward swept stirring vane relative to the associated cooking vessel, the drive assembly being secured to the associated cooking; and wherein the drive assembly and an upper portion of the at least one forward swept stirring vane are disposed about the periphery of the opening of the associated cooking vessel so as to define a substantially unimpeded central upper opening for providing central access to the associated cooking vessel during operation of the automatic stirring system.

2. The automatic stirring system of claim 1, wherein the at least one stirring vane includes at least one aperture extending therethrough.

3. The automatic stirring system of claim 1, wherein the at least one stirring vane includes a bottom edge, an outer edge, and an upper edge, and wherein the bottom edge and the outer edge of the at least one stirring vane are proximal to an inner surface of the associated cooking vessel.

4. The automatic stirring system of claim 3, wherein the upper edge of the at least one stirring vane slopes downward from the outer edge of the at least one stirring vane toward the center of the associated cooking vessel.

5. The automatic stirring system of claim 1, further including a ring member rotatably mounted to the associated cooking vessel, the at least one forward swept stirring vane secured to the ring member and the ring member operatively coupled to the drive assembly for rotating the at least one forward swept stirring vane.

6. The automatic stirring system of claim 1, wherein the drive assembly includes a variable speed control unit for adjusting the rotational speed of the at least one forward swept stirring vane.

7. The automatic stirring system of claim 1, wherein the generally concave leading surface of the at least one forward swept stirring vane includes a tip portion having a negative slope, a middle portion having a zero slope, and a root portion having a positive slope with respect to a horizontal axis defined between the tip portion and the root portion of the at least one forward swept stirring vane and along the radial direction from the axis of rotation of the at least one forward swept stirring vane.

8. The automatic stirring system of claim 1, wherein the leading surface of the at least one stirring vane is angled rearwardly about the radial direction.

9. An automatic stirring system for being selectively mounted to an associated cooking vessel, the cooking vessel having an opening for receiving food items, the automatic stirring system comprising:

a ring member rotatably mounted to the associated cooking vessel;

a drive assembly operatively coupled to the ring member for rotating the ring member relative to the associated cooking vessel, the drive assembly being secured to the associated cooking vessel; and at least one stirring vane attached to the ring member, the at least one stirring vane disposed within the associated cooking vessel;

wherein the ring member, the drive assembly, and an upper portion of the at least one stirring vane are disposed about the periphery of the opening of the associated cooking vessel so as to define a substantially unimpeded central upper opening for providing central access to the associated cooking vessel during operation of the automatic stirring system.

10. The automatic stirring system of claim 9, wherein the at least one stirring vane includes at least one aperture extending therethrough.

11. The automatic stirring system of claim 9, wherein the at least one stirring vane includes a bottom edge, an outer edge, and an upper edge and wherein the bottom edge and the outer edge of the at least one stirring vane slideably engage an inner surface of the associated cooking vessel during operation of the automatic stirring system.

12. The automatic stirring system of claim 11, wherein the upper edge of the at least one stirring vane slopes downward from the outer edge of the at least one stirring vane toward the center of the associated cooking vessel.

13. The automatic stirring system of claim 9, wherein the at least one stirring vane is forward swept.

14. The automatic stirring system of claim 9, wherein the drive assembly includes a power source, a motor, and a reduction unit.

15. The automatic stirring system of claim 9, wherein the drive assembly further includes a variable speed control unit and a speed sensor operatively coupled to a rotating component of the drive assembly, the speed sensor capable of producing a signal relative to the speed of the rotating component.

16. The automatic stirring system of claim 15, wherein the variable speed control unit receives a speed sensor signal from the speed sensor for maintaining a constant output speed of the drive assembly.

17. The automatic stirring system of claim 9, wherein the ring member includes a relief along an upper surface of the ring member for receiving a lid of the associated cooking vessel.

18. The automatic stirring system of claim 9, wherein the ring member and the at least one stirring vane are integrally formed as one piece.

19. An automatic stirring vessel for receiving and cooking an associated food item, the automatic stirring vessel comprising:
a container for receiving and cooking the associated food item, the container having a bottom and a side wall;
at least one handle secured to the container;
a ring member rotatably mounted about a periphery of the container;
a drive assembly including a motor and a reduction unit disposed internally to the at least one handle and an output of drive assembly coupled to the ring member for rotating the ring member relative to the container; and
at least one forward swept stirring vane secured to the ring member, the at least one forward swept stirring vane including a leading surface, the leading surface having a generally concave profile extending in a radial direction from an axis of rotation of the at least one forward swept stirring vane, the vane being disposed within the container for stirring the associated food item.

20. The automatic stirring vessel of claim 19, wherein the drive assembly further includes a power source disposed within the at least one handle.

21. The automatic stirring vessel of claim 20, wherein the drive assembly further includes an electronic variable speed control unit for adjusting the output speed of the drive assembly.

22. The automatic stirring vessel of claim 19, wherein the drive assembly further includes a right angle drive coupling, the coupling disposed between the motor and the reduction unit.

23. The automatic stirring vessel of claim 19, wherein the leading surface of the at least one stirring vane is angled rearwardly about the radial direction.

* * * * *